United States Patent [19]

Williams et al.

[11] Patent Number: 5,434,338
[45] Date of Patent: Jul. 18, 1995

[54] PROCESS FOR CONDITIONING WASTE MATERIALS AND PRODUCTS THEREFROM

[75] Inventors: Raymond F. Williams, Massillon; John F. Stoffer, Canton, both of Ohio

[73] Assignee: US Technology Recycling Corporation, Canton, Ohio

[21] Appl. No.: 122,387

[22] Filed: Sep. 16, 1993

[51] Int. Cl.⁶ .................................................. B09B 3/00
[52] U.S. Cl. ...................................... 588/255; 588/256
[58] Field of Search ................. 588/249, 252, 255, 256, 588/257

[56] References Cited

U.S. PATENT DOCUMENTS

| | | | |
|---|---|---|---|
| 3,991,005 | 11/1976 | Wallace | 588/255 X |
| 4,077,901 | 3/1978 | Arnold et al. | 252/301.1 |
| 4,234,632 | 11/1980 | Lubowitz | 428/2 |
| 4,379,763 | 4/1983 | Clemens et al. | 252/628 |
| 4,424,148 | 1/1984 | Rosenstiel et al. | 252/628 |
| 4,585,583 | 4/1986 | Roberson et al. | 252/628 |
| 4,599,196 | 7/1986 | de Tassigny | 252/628 |
| 4,664,819 | 5/1987 | Glaze et al. | 252/8.551 |
| 4,756,681 | 7/1988 | Unger et al. | 425/112 |
| 4,772,430 | 9/1988 | Sauda et al. | 588/255 |
| 4,859,395 | 8/1989 | Unger et al. | 264/254 |
| 4,927,564 | 5/1990 | Barlou et al. | 252/628 |
| 4,932,853 | 6/1990 | Unger et al. | 425/112 |
| 5,304,707 | 4/1994 | Blankenship | 588/255 |

*Primary Examiner*—David H. Corbin
*Attorney, Agent, or Firm*—Michael Sand Co.

[57] ABSTRACT

A process for conditioning waste materials containing at least one waste material plastic, includes the steps of mixing the waste material to form a homogenous plurality of particulate waste material members; and, blending the homogenous plurality of particulate waste material members with a thermosetting blend resin and a cross-linking catalyst to form a blend. The waste material plastic forms ionic bonds with the thermosetting blend resin. A filled plastic product according to the invention includes a thermosetting resin matrix, and a filler material having a plurality of particles containing at least one component selected from the group consisting of heavy metals and filler plastics. The filler resins are selected from the group consisting of thermosetting materials and thermoplastic materials, and mixtures thereof.

12 Claims, No Drawings

PROCESS FOR CONDITIONING WASTE MATERIALS AND PRODUCTS THEREFROM

TECHNICAL FIELD

The present invention is directed toward a process for conditioning spent waste products. More particularly, the present invention provides a process for conditioning waste products containing heavy metals, plastics, paints and the like. The invention is also directed toward filled plastic products employing spent waste materials as a filler therein.

BACKGROUND OF THE INVENTION

There has been considerable effort expended in various industries, such as in the paint blasting industry, as to the disposal of the waste products. For example, in paint blasting, the spent blast media normally includes the spent blast media as well as paint chips and the like which often include heavy metals. Because of the presence of the potentially hazardous heavy metals and other spent blast media components, there is considerable government regulation and public interest in the collecting and disposal of such materials.

The present invention has application to numerous processes wherein it is desired to dispose of a waste material containing various materials such as acrylic or urea-formaldehyde plastic materials, and heavy metals and other contaminants. For the purpose of illustration only, the present discussion will make reference to blasting medias, it being understood that all similar waste materials are within the scope of the present invention.

One approach in the art to disposing of spent blast or waste materials has included encapsulating an agglomeration of the waste materials in a suitable plastic coating and then land-filling the coated agglomeration. Presumably the plastic coating is sufficient to prevent migration of the hazardous materials therein or leaching therefrom.

For example, U.S. Pat. No. 4,234,632 discloses a solid waste encapsulation process wherein a solid particulate waste material is coated with a thermosetting resin and then compressed to form a rigid core. The rigid core is then itself encapsulated in a thermoplastic resin to provide a sealed, encapsulated waste agglomerate which can withstand moderate compressive forces. It is important for land-fill operations that the agglomerate be able to withstand compressive forces.

The known processes for encapsulating waste materials, while possibly being sufficient for disposal of the waste material, provides no advantage other than meeting disposal criteria. The hazardous waste material often remains classified by relevant governmental regulations as a hazardous waste not suitable for disposal.

A need exists therefore, for a process and a product which conditions waste materials for a use other than mere disposal. The process and product should condition the waste such that according to current governmental regulations, it is not classified as a hazardous product.

SUMMARY OF INVENTION

It is therefore, an object of the present invention to provide a process for the conditioning of waste materials containing for example, plastics and heavy metals.

It is another object of the present invention to provide a process which conditions the waste material such that the resulting product is a useful filler material.

It is yet another object of the present invention to provide a filled plastic product.

At least one or more of the foregoing objects, together with the advantages thereof over the known art relating to waste material conditioning, which shall become apparent from the specification which follows, are accomplished by the invention as hereinafter described and claimed.

In general, a process for conditioning waste materials containing at least one waste material plastic, comprises the steps of mixing the waste material to form a homogenous plurality of particulate waste material members; and, blending the homogenous plurality of particulate waste material members with a thermosetting blend resin and a cross-linking catalyst to form a blend; such that the waste material plastic forms ionic bonds with the thermosetting blend resin.

A filled plastic product according to the invention comprises a thermosetting resin matrix; and, a filler material comprising a plurality of particles containing at least one component selected from the group consisting of heavy metals and filler plastics. The filler plastics are selected from the group consisting of thermosetting materials and thermoplastic materials, and mixtures thereof.

PREFERRED EMBODIMENT FOR CARRYING OUT THE INVENTION

The present invention is directed toward a process for conditioning waste materials, and to useful products resulting therefrom. The waste materials contemplated by the present invention include those having various mixtures of plastics, heavy metals, and the like. The invention has application to numerous waste products, and therefore, it is not possible to provide a limitation as to the amounts of each component in a given waste material to be conditioned. The invention has particular application however, to paint blasting operations which may employ a thermoplastic materials such as acrylic, or a thermosetting material such as urea-formaldehyde, as the blasting media. After the blasting operation is completed, the spent material is collected and conditioned according to the present invention. Depending upon the particular blasting operation, the resulting waste material may include heavy metals such as silver, arsenic, barium, chromium, selenium, lead, mercury, nickel and cadmium, titanium, zinc, or mixtures thereof. Furthermore, many paints will also include acrylic, epoxy, polyurethane, other enamels, and the like, which also become a component of the waste material. The waste material plastics according to the present invention include all such materials such as for example, polyester, acrylic, urea formaldehyde and melamine formaldehyde, and mixtures thereof.

By "conditioning" and similar terms, as used herein, it is understood to mean that the waste material is subjected to the process according to the present invention, as will be more fully addressed hereinbelow.

The present invention conditions the waste material such that the material becomes an effective filler material for a filled plastic product. As known in the art, ordinary fillers for filled plastic products include for example, sand, calcium carbonate, aluminum trihydrate or the like. While such fillers work well for their intended purpose, it has been found that they often add considerable weight to the filled product. The present invention provides similar filling properties to a filled plastic material at a substantial weight reduction over conventional filler materials. The resulting products also possess and inherent strength comparable with or superior to conventionally filled products, as will be addressed hereinbelow.

According to the present invention, the waste material such as from a paint blasting operation will contain pulverized particles of the materials discussed hereinabove. Furthermore, the spent materials may include one or more such materials. The spent materials are first mixed to form a homogenous blend of uniform particles. A solvent is preferably employed. More preferably, the solvent is capable of dissolving the plastic materials in the spent blast media. Exemplary solvents include styrene, acetone, methyl ethyl ketone, and the like. Styrene and acetone are preferred.

It is preferred that the waste material be in the form of a plurality of particulate waste material members having an average size diameter of from about 0.06 to about 0.0015 inches, which is preferred for use as a filler in a filled plastic product. Other sizes outside of this range are of course, within the scope of the invention if the particulate waste material is employed as a filler in a filled plastic product.

The waste materials, containing the waste material plastic or plastics and optionally, at least one heavy metal as discussed hereinabove, is then blended with a thermosetting blend resin, a cross-linking catalyst and a solvent. Preferably, the thermosetting blend resin is selected from the group consisting of polyester, urethane, epoxy, acrylic and vinyl ester resins, or other thermosetting resins, and mixtures thereof.

The cross-linking catalyst is employed to catalyze the formation of cross-link bonds between the waste material plastic and the thermosetting blend resin. Furthermore, if the waste material contains paint chips which contain a plastic component, ionic crosslink bonds may also occur between the these plastics, the waste material plastic and the thermosetting blend resin. Any cross-linking catalyst which is conventional in the art may be employed in the present invention. The exact catalyst chosen will often vary depending upon the nature of the waste material to be conditioned. Examples of useful cross-linking catalysts include organic peroxides such as methyl ethyl ketone peroxide, commercially available as LUPERSOL TM from Atochem North America, Inc. of Buffalo, N.Y.; SUPEROX TM from Reichhold Chemicals, Inc. of Pensacola, Fla.; and HIGH-POINT TM from Witco Chemical Corp. of New York, N.Y. The ionic bonding between the thermosetting resin blend and the waste material plastic improves the physical adhesion between the filler material and the thermosetting blend resin.

The solvent employed is not critical to the practice of the present invention, and will be a conventional solvent for molding a filled plastic product. Examples of useful solvents include those discussed above, and preferably, styrene or acetone.

An exemplary conditioned waste material according to the present invention includes a blend of from about 20 to about 80 parts by weight of the plurality of particulate waste material members, and from about 80 to about 20 parts by weight of the thermosetting blend resin.

It will be appreciated by those skilled in the art, that the present invention is therefore, not an encapsulation process. Rather, the waste material components either form ionic bonds with the thermosetting blend resin matrix, or the materials are held within the interstitial network of the cross-link bonds, as is believed to occur with respect to heavy metals and as will be demonstrated hereinbelow. Thus, substantially the entire waste product is incorporated into a new filled plastic product. As such, the filled product according to the invention is considered to be a secondary material and not a hazardous waste according to current governmental regulations.

The thermosetting blend resin is thus filled with the pulverized waste material. The filled plastic material may then be molded according to conventional filled plastic material molding techniques. The resulting product is lighter than conventionally filled plastic materials because the waste material plastic or plastics which form part of the filler material are lighter then conventional filler materials. Furthermore, the products are believed to be generally stronger than conventionally filled plastic products because of the network of ionic bonds that are formed between the filler material of the present invention and the thermosetting blend resin matrix.

While not being a limitation of the invention, examples of useful molded or cast filled plastic products include table tops, vanities, tub and shower walls, sills, trim moldings, urinal dividers, decorative castings or the like.

GENERAL EXPERIMENTAL

In order to demonstrate the effectiveness of a conditioned waste material according to the present invention, a number of samples were prepared according to the disclosure made hereinabove. The samples were then tested according to a standard Toxicity Characteristic Leaching Procedure (TCLP) extraction test according to U.S. Environmental Protection Agency Procedure 1311, to determine the amount of metals extractable therefrom. By comparing the extracted amounts to the amounts allowed by current governmental regulations, it can be shown that as believed, the heavy metals in the waste material are substantially prevented from being extracted from the samples. Thus, the present invention is useful in conditioning waste materials and in providing filled plastic products and represents an improvement over the known means of conditioning and disposing of waste materials.

In the tables provided hereinbelow, the symbol "<" means "less than".

A 500 gram masterbatch waste material was procured which included 50 parts by weight each of acrylic and urea-formaldehyde plastic blast media, which masterbatch was contaminated with approximately 15 parts by weight of paint dust residue. The masterbatch was spike with chromium and cadmium to increase the level of contamination of these components.

Experiment No. 1

A 100 gram sample of the masterbatch was subjected to a standard TCLP test, to determine the level of the heavy metals extracted therefrom, to be used as a comparative example to the invention experiments reported hereinbelow. The results of this test are reported in TABLE I hereinbelow.

TABLE I

| METALS | TCLP EXTRACTION[a] | |
|---|---|---|
| | RESULT[b] | LOD[c] |
| Silver | <0.025 | 0.025[b] |
| Arsenic | <0.05 | 0.05[b] |
| Barium | 0.98 | 0.25[b] |
| Chromium | <145 | 0.05[b] |
| Selenium | <0.05 | 0.05[b] |
| Lead | <0.05 | 0.05[b] |
| Mercury | <0.001 | 0.001[b] |
| Nickel | 0.189 | 0.025[b] |
| Cadmium | 17.3 | 0.01[b] |

[a]U.S. EPA Procedure 1311
[b]milligrams/liter
[c]Limit of Detection

The balance of 400 grams of the masterbatch was then mixed with 175 grams of polyester thermosetting resin, SUPEROX ™ and an excess of styrene.

Experiment No. 2

A 100 gram sample in the form of a ⅜ inch sheet was subjected to a standard TCLP test, with the results being reported in TABLE II hereinbelow.

TABLE II

| METALS | TCLP EXTRACTION[a] | |
|---|---|---|
| | RESULT[b] | LOD[c] |
| Silver | <0.025 | 0.025[b] |
| Arsenic | <0.005 | 0.005[b] |
| Barium | <0.25 | 0.25[b] |
| Chromium | 0.059 | 0.05[b] |
| Selenium | <0.005 | 0.005[b] |
| Lead | 0.052 | 0.05[b] |
| Mercury | <0.001 | 0.001[b] |
| Nickel | <0.025 | 0.025[b] |
| Cadmium | <0.01 | 0.01[b] |

[a]U.S. EPA Procedure 1311
[b]milligrams/liter
[c]Limit Of Detection

Experiment No. 3

Another 100 gram sample as in Experiment No. 2 was subjected to a TCLP extraction test for seven days. The results are reported in TABLE III hereinbelow.

TABLE III

| METALS | TCLP EXTRACTION[a] | |
|---|---|---|
| | RESULT[b] | LOD[c] |
| Silver | <0.025 | 0.025[b] |
| Arsenic | <0.005 | 0.005[b] |
| Barium | <0.25 | 0.25[b] |
| Chromium | 0.111 | 0.05[b] |
| Selenium | <0.005 | 0.005[b] |
| Lead | <0.05 | 0.05[b] |
| Mercury | <0.001 | 0.001[b] |
| Nickel | <0.025 | 0.025[b] |
| Cadmium | <0.01 | 0.01[b] |

[a]U.S. EPA Procedure 1311
[b]milligrams/liter
[c]Limit Of Detection

Experiment No. 4

Another 100 gram sample as in Experiment No. 2 was sawed so as to be representative of a construction by-product, into chunks wherein approximately 60 percent by weight were reduced to a size of less than about 1 inch×½ inch×⅜ inch, with the remaining 40 percent by weight being sawdust. This experiment demonstrates the usefulness of a filled plastic product according to the present invention. The sample was then subjected to a standard TCLP test with the results being reported in TABLE IV hereinbelow.

TABLE IV

| METALS | TCLP EXTRACTION[a] | |
|---|---|---|
| | RESULT[b] | LOD[c] |
| Silver | <0.025 | 0.025[b] |
| Arsenic | <0.005 | 0.005[b] |
| Barium | 0.65 | 0.25[b] |
| Chromium | 3.73 | 0.05[b] |
| Selenium | <0.005 | 0.005[b] |
| Lead | 0.334 | 0.05[b] |
| Mercury | <0.001 | 0.001[b] |
| Nickel | <0.025 | 0.025[b] |
| Cadmium | 0.574 | 0.01[b] |

[a]U.S. EPA Procedure 1311
[b]milligrams/liter
[c]Limit of Detection

As can be seen, the control sample in Experiment No. 1 showed a chromium extraction of 145 milligrams/liter, and cadmium extraction of 17.3 milligrams/liter. Regulatory levels for these metals are prescribed as being at most, 5.0 milligrams/liter of chromium and 1.0 milligrams/liter of cadmium. Experiment No. 2 shows that an identical sample which is conditioned according to the present invention, has a chromium extraction of 0.059 milligrams/liter and a cadmium extraction of 0.01 milligrams/liter. Even after seven days, as shown in Experiment No. 3, the chromium extraction level was 0.111 milligrams/liter and the cadmium level was 0.01 milligrams/liter.

After being formed into a filled plastic product and subjected to construction-like applications, as in Experiment No. 4, a TCLP test indicated a chromium extraction level of 3.73 milligrams/liter and a cadmium level of 0.574 milligrams/liter, well within the regulatory limitations.

Thus it should be evident that the process and products of the present invention are highly effective in conditioning waste materials. The invention is particularly suited for the conditioning of spent paint blasting media, but is not necessarily limited thereto. The process and products of the present invention can be used separately with other equipment, methods and the like, as well as for the manufacture of other filled plastic products, other than those exemplified hereinabove.

Based upon the foregoing disclosure, it should now be apparent that the use of the process and products described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, the nature of the waste material to be conditioned, the nature of the thermosetting blend resin, catalysts, solvents and the like, according to the present invention are not necessarily limited to those exemplified hereinabove, nor to the specific component amounts exemplified. Thus, the scope of the invention shall include all modifications and variations that may fall within the scope of the attached claims.

What is claimed is:

1. A process for manufacturing plastic products from waste materials containing at least one waste material plastic and at least one waste material heavy metal, comprising the steps of:

mixing the waste material plastic and waste material heavy metal to form a homogenous plurality of particulate waste material members;

mixing the waste materials with a solvent capable of at least partially dissolving the waste material plastic whereby the waste material heavy metal is suspended in the waste material plastic;

blending the dissolved waste material plastic with the suspended waste material heavy metal with a thermosetting blend resin and a cross-linking catalyst to form a blend, whereby the waste material plastic forms ionic bonds with said thermosetting blend resin and the waste material heavy metals are retained within the molecular bonds of the thermosetting blend resin and waste material plastic to prevent the leaching of the waste material heavy metals from the plastic product; and molding a plastic product from the blend.

2. A process as set forth in claim 1, wherein said waste material plastic is selected from the group consisting of polyester, acrylic, urea formaldehyde and melamine formaldehyde, and mixtures thereof.

3. A process as set forth in claim 1, wherein said thermosetting blend resin is selected from the group consisting of polyester, urethane, epoxy, acrylic and vinyl ester resins, and mixtures thereof.

4. A process as set forth in claim 1, wherein said blend comprises from about 20 to about 80 parts by weight of said plurality of particulate waste material members, and from about 80 to about 20 parts by weight of said thermosetting blend resin.

5. A process as set forth in claim 1, wherein said particulate waste material members have an average diameter of from about 0.06 to about 0.0015 inches.

6. A process as set forth in claim 1, wherein said catalyst is selected from the group consisting of organic peroxides.

7. A process as set forth in claim 6, wherein said organic peroxide is methyl ethyl ketone peroxide.

8. A filled plastic product comprising:
a thermosetting resin matrix;
a filler material comprising a plurality of particles containing at least one waste heavy metal component and at least one waste filler plastic component wherein said filler plastics are selected from the group consisting of thermosetting materials and thermoplastic materials, and mixtures thereof; and
said thermosetting resin matrix and said waste filler plastic being ionically bonded, and the waste heavy metal components being retained within the molecular bonds of the thermosetting blend resin matrix and the waste filler plastic.

9. A product as set forth in claim 8, wherein said filler material is pulverized, spent paint blasting media.

10. A product as set forth in claim 8, wherein said thermosetting resin matrix is selected from the group consisting of polyester, urethane, epoxy, acrylic and vinyl ester resins and mixtures thereof.

11. A product as set forth in claim 8, wherein said heavy metal is selected from the group consisting of silver, arsenic, barium, chromium, selenium, lead, mercury, nickel, cadmium, titanium, zinc and mixtures thereof.

12. A product as set forth in claim 8, wherein said filler material is selected from the group consisting of polyester, acrylic, urea formaldehyde, melamine formaldehyde, and mixtures thereof.

* * * * *